(12) United States Patent
Zhu

(10) Patent No.: US 12,117,716 B2
(45) Date of Patent: Oct. 15, 2024

(54) STAND FOR PHOTOGRAPHIC EQUIPMENT

(71) Applicant: ZHONGSHAN DASHAN PHOTOGRAPHIC EQUIPMENT CO., LTD., Zhongshan (CN)

(72) Inventor: Xihua Zhu, Zhongshan (CN)

(73) Assignee: ZHONGSHAN DASHAN PHOTOGRAPHIC EQUIPMENT CO., LTD., Zhongshan (CN)

( * ) Notice: Subject to any disclaimer, the term of this patent is extended or adjusted under 35 U.S.C. 154(b) by 52 days.

(21) Appl. No.: 17/903,053

(22) Filed: Sep. 6, 2022

(65) Prior Publication Data

US 2022/0413368 A1 Dec. 29, 2022

Related U.S. Application Data

(63) Continuation of application No. PCT/CN2021/125038, filed on Oct. 20, 2021.

(30) Foreign Application Priority Data

Mar. 25, 2021 (CN) .......................... 202110322604.8
Mar. 25, 2021 (CN) .......................... 202120622594.5

(51) Int. Cl.
*G03B 17/56* (2021.01)
*F16M 11/14* (2006.01)
(Continued)

(52) U.S. Cl.
CPC ........... *G03B 17/561* (2013.01); *F16M 11/14* (2013.01); *F16M 11/16* (2013.01); *F16M 11/38* (2013.01)

(58) Field of Classification Search
CPC ...... G03B 17/561; F16M 11/14; F16M 11/16; F16M 11/38
See application file for complete search history.

(56) References Cited

U.S. PATENT DOCUMENTS

| 10,632,606 B1 | 4/2020 | Wang |
| 2018/0274719 A1 | 9/2018 | Orf |
| 2022/0413368 A1 | 12/2022 | Zhu |

FOREIGN PATENT DOCUMENTS

| CN | 106050834 A | * 10/2016 | ................ F16B 1/02 |
| CN | 107773298 A | 3/2018 | |

(Continued)

OTHER PUBLICATIONS

CNIPA, Office Action issued for Chinese Application No. 202110322604.8, mailed Jun. 28, 2024 (16 pages).

*Primary Examiner* — Minh Q Phan

(57) ABSTRACT

A stand for photographic equipment includes a connecting member, a pedestal, and a locking assembly connected therebetween. The locking assembly includes a support rod, a guiding member mounted around the support rod, a locking pin fixed on the support rod and engaged with the guiding member, a spring member located between the pedestal and the guiding member, and a driving member pivotally connected to the support rod. One end of the support rod and the connecting member are rotatably connected with each other by a universal ball. The locking assembly is configured to make the locking pin move along the guiding member to a first fixed position or a second fixed position by pressing the driving member. In the first fixed position, a top end of the guiding member abuts against and locks the connecting member. In the second fixed position, the guiding member releases the connecting member.

20 Claims, 11 Drawing Sheets

(51) Int. Cl.
*F16M 11/16* (2006.01)
*F16M 11/38* (2006.01)

(56) References Cited

FOREIGN PATENT DOCUMENTS

| | | | |
|---|---|---|---|
| CN | 208058321 U | 11/2018 | |
| CN | 210165148 A | 3/2020 | |
| CN | 112879762 A | 6/2021 | |
| CN | 214839721 U | 11/2021 | |
| GB | 855652 A | 12/1960 | |
| GB | 2582820 A | * 10/2020 | ............. F16M 11/02 |

\* cited by examiner

STAND FOR PHOTOGRAPHIC EQUIPMENT

CROSS REFERENCE OF RELATED APPLICATIONS

The present application claims priority of PCT Patent Application No. PCT/CN2021/125038, filed on Oct. 20, 2021, which claims priority of Chinese Patent Application No. 202110322604.8 and Chinese Utility Model Application No. 202120622594.5 both filed on Mar. 25, 2021, the entire contents of which are hereby incorporated by reference.

TECHNICAL FIELD

The present disclosure relates to photographic equipment, and particularly to a stand for photographic equipment.

BACKGROUND

In the current photography industry, a stand is a common support for photographic equipment, which has the advantage of being easy to carry. In order to meet the requirements of rotation photographing, close-range and long-range switchable shooting, dynamic photographing following an object, most of the stands commercially available can rotate in multiple directions about respective axes through a support point. However, the stand is required to be locked when the photographic equipment is operated in a stationary state for a long time. A locking assembly is used to achieve switch between a freely rotatable state and a locked state of the stand. The traditional locking assembly adopts screw fastening, which is complex and time-consuming to operate, failure to have a one-step process. When the screw locking assembly is frequently switched between the freely rotatable state and the locked states, it will be extremely inconvenient and low efficiency, which may result in missing of the best opportunity for shooting.

SUMMARY

In view of this, the present disclosure provides a stand for photographic equipment, configured for supporting the photographic equipment. The stand includes a connecting member, a pedestal; and a locking assembly connected between the connecting member and the pedestal. The locking assembly includes a support rod; a guiding member mounted around the support rod; a locking pin fixed on the support rod and engaged with the guiding member; a spring member located between the pedestal and the guiding member; and a driving member pivotally connected to the support rod. One end of the support rod and the connecting member are rotatably connected with each other by a universal ball, the locking assembly is configured to make the locking pin move along the guiding member to a first fixed position or a second fixed position by pressing the driving member, wherein when the locking pin is located at the first fixed position, a top end of the guiding member abuts against and locks the connecting member, and when the locking pin is located at the second fixed position, the guiding member releases the connecting member.

In some embodiments, the universal ball is mounted on a top end of the support rod, a bottom end of the connecting member facing the locking assembly is recessed at a central portion thereof to define a receiving chamber therein for receiving the universal ball, a limiting surface is formed on a circumferential edge of the receiving chamber, an abutting surface is formed on the top end of the guiding member corresponding to the limiting surface, and wherein the abutting surface and the limiting surface are configured to abut against each other.

In some embodiments, the guiding member is substantially cylindrical, and includes a base portion and an extending portion protruding from the base portion, a step is formed on a joint part of the base portion and the extending portion to support the driving member, and wherein the abutting surface is formed on a top end of the extending portion away from the base portion.

In some embodiments, a longitudinal mounting groove is defined in the extending portion along a length direction thereof, the driving member is pivotally connected to the support rod by a connecting pin, the connecting pin extends through the driving member, the mounting groove of the extending portion of the guiding member that is mounted around the support rod, and the support rod in sequence, and is movable up and down along the mounting groove when the guiding member is urged by the spring member to move.

In some embodiments, the spring member is mounted around the support rod with one end thereof received in the base portion, and the spring member is configured to elastically urge the base portion.

In some embodiments, the locking pin includes a fixing part and a hook, the fixing part is pivotally connected to the support rod, and the hook is received in the guiding member for engaging therewith.

In some embodiments, a guiding groove is defined in an inner surface of the guiding member, a top end of the guiding groove towards the connecting member forms a first temporary limiting part and a second temporary limiting part spaced from the first temporary limiting part, a positioning part is formed below the first temporary limiting part and the second temporary limiting part, and the locking pin is engageable with the first temporary limiting part, the second temporary limiting part, and the positioning part.

In some embodiments, a longitudinal cross section of the first temporary limiting part and a longitudinal cross section of the second temporary limiting part are both in the form of an inverted V shape with an opening, and the openings are orientated towards a first direction, and a top end of the second temporary limiting part is located at a level above a top end of the first temporary limiting part.

In some embodiments, the guiding groove further includes a portion having a substantially Y-shaped longitudinal cross section, two top ends of the portion are respectively connected to the first temporary limiting part and the second temporary limiting part, wherein the top end of the portion that is connected to the first temporary limiting part is located at a level above the top end of the portion that is connected to the second temporary limiting part.

In some embodiments, a longitudinal cross section of the positioning part is substantially V-shaped with an opening inclined towards a second direction opposite to the first direction.

In some embodiments, the stand further includes a locking member lockable relative to the universal ball, wherein a receiving groove is defined in an outer periphery of the connecting member, the locking member includes a locking sleeve mounted around the connecting member, a locking block movably received in the receiving groove, and a locking element located at a bottom end of the universal ball; wherein an inner end of the locking block is capable of extending into the connecting member via the receiving groove and abutting against the locking element, wherein the locking member is configured such that when the locking sleeve is driven to move upwardly along a longitudinal direction of the connecting member to push the locking block to move inwardly, the locking block drives the locking element to move upwardly until the locking element is locked relative to the universal ball.

In some embodiments, the stand further includes a reset spring configured to provide an outward elastic force to the locking block, the reset spring is received in the receiving groove, one end of the reset spring abuts against a wall of the receiving groove, and the other end of the reset spring abuts against the locking block.

In some embodiments, the locking sleeve is annular and continuous in a circumferential direction thereof, and includes a locking section and a guiding section along an axial direction thereof, the locking section is configured to move up and down along the connecting member, the guiding section extends upwardly from a top end of the locking section, an inner diameter of the guiding section increases gradually from a bottom end connected to the locking section to a top end, a gap is defined between an inner surface of the guiding section and an outer surface of the connecting member, and a width of the gap increases gradually from bottom to top.

In some embodiments, the locking block includes a connecting portion and a protruding portion extending upwardly from the connecting portion, the connecting portion is received in the receiving groove, the protruding portion includes a pushing surface inclined towards the locking element, and the pushing surface extends upwardly and outwardly from a bottom end thereof to contact the locking element.

In some embodiments, the protruding portion is located at a top portion of the receiving groove, a bottom of the protruding portion is connected a top of the connecting portion, an outer side of the protruding portion extends out of the receiving groove into the gap between the locking sleeve and the connecting member, an outer surface of the protruding portion faces the inner surface of the guiding section, a top surface of the protruding portion connects top ends of the outer surface and the pushing surface of the protruding portion, an inner side of the protruding portion extends beyond an inner side of the connecting portion.

In some embodiments, the locking element includes a locking surface towards the universal ball and a contacting surface engaged with the pushing surface of the locking block, the locking surface is fitted with the universal ball and configured to conform the universal ball, and the contacting surface extends outwardly and upwardly from bottom to top.

In some embodiments, the locking element is annular and an inner diameter thereof decreases gradually from top to bottom, an opening is defined at a bottom end of the locking element, a size of the opening is smaller than a size of the universal ball, and thus the universal ball is partially receivable in the locking element without being detached from the opening, the contacting surface is formed at an outer periphery of a bottom of the locking element, the contacting surface extends inclinedly from a central portion of the locking element radially outwardly and upwardly to be engaged with the inclined pushing surface of the locking block.

In some embodiments, the stand further includes a gasket fixed on the universal ball, and the locking element is configured to directly contact the gasket.

In some embodiments, the locking member further includes a limiting member, the limiting member is fixed on a bottom of the connecting member to prevent the locking sleeve from screwing out from the connecting member.

In some embodiments, the stand further includes a protective sleeve mounted around a middle portion of an outer surface of the locking sleeve.

In the present disclosure, the stand can be switched between the locked state and unlocked state, i.e., the freely rotatable state, by pressing the driving member. The operation is convenient and high efficiency.

DETAILED DESCRIPTION OF THE EMBODIMENTS

In order to make the technical solutions and beneficial effects of the present disclosure apparent, the present disclosure will be described in detail below with reference to the accompanying drawings and specific embodiments. It can be understood that the accompanying drawings are only for reference and illustration, and are not intended to limit the present disclosure. The dimensions shown in the accompanying drawings are only for the convenience of describing clearly, and do not limit the proportional relationship of the elements.

Figure 1:
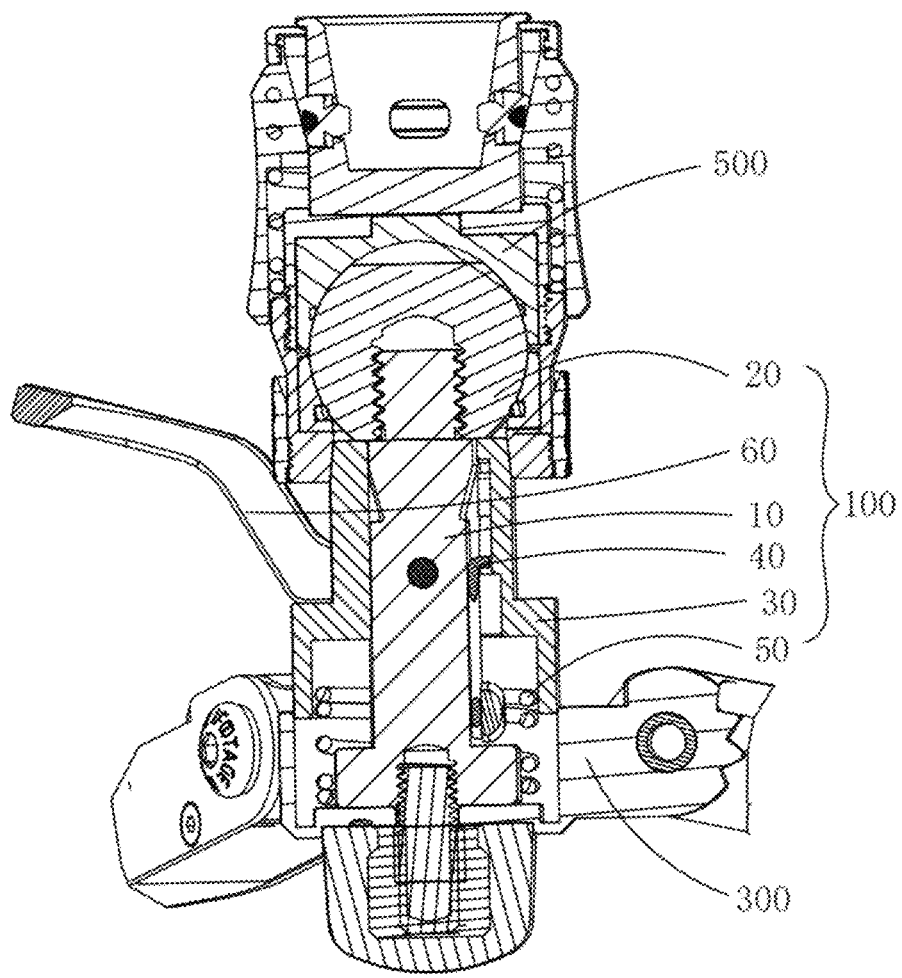
FIG. 1 is a cross sectional view of a stand according to a first embodiment of the present disclosure, wherein the stand is in a locked state.
Figure 2:
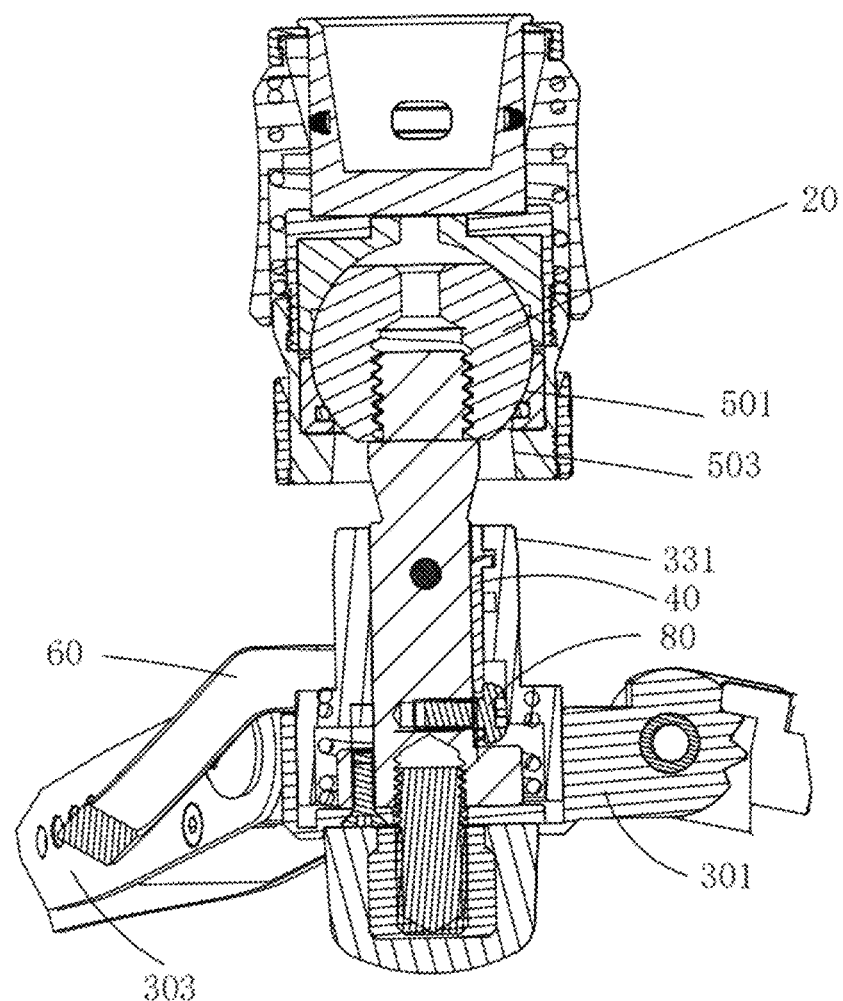
FIG. 2 is a cross sectional view of the stand of FIG. 1, wherein the stand is unlocked and in an unlocked state.

Referring to FIG. 1 and FIG. 2, which illustrate a stand for photographic equipment. The stand is used to support a photographic equipment, such as a video camera, a camera, and the like. The stand includes a connecting member 500, a pedestal 300 spaced from the connecting member 500 and a locking assembly 100 located between the connecting member 500 and the pedestal 300. The locking assembly 100 connects the connecting member 500 with the pedestal 300. In this embodiment, the connecting member 500 may be connected to a platform (not labeled) can by a connecting rod 91 (shown in FIG. 10) to form a monopod, or the connecting member 500 may be directly connected to the platform to form an apparatus for low angle shooting. The locking assembly 100 includes a support rod 10, a guiding member 30 mounted around the support rod 10, a locking pin 40 fixed on the support rod 10 and engaged with the guiding member 30, a spring member 50 located between the pedestal 300 and the guiding member 30, and a driving member 60 pivotally connected to the support rod 10. One end of the support rod 10 and the connecting member 500 are rotatably connected each other by a universal ball 20. The locking assembly 100 is configured to make the locking pin 40 move along the guiding member 30 to a first fixed position or a second fixed position by pressing the driving member 60. When the locking pin 40 is located at the first fixed position, a top end of the guiding member 30 abuts against and locks the connecting member 500. When the locking pin 40 is located at the second fixed position, the guiding member 30 releases the connecting member 500.

The universal ball 20 is fixedly mounted to a top end of the support rod 10. The support rod 10 and the connecting member 500 are connected by the universal ball 20. The universal ball 20 is movably received in the connecting member 500, as such, the connecting member 500 and the locking assembly 100 are rotatably connected with each other.

When the driving member 60 is pressed downwardly, the driving member 60 presses the guiding member 30 or move away from the guiding member 30, such that the guiding member 30 slides along the support rod 10 to elastically abut against the spring member 50. When the guiding member 30 is moved upwardly to the top end of the support rod 10 and abuts against the connecting member 500, the locking pin 40 slides relative to the guiding member 30 to the first fixed position. At that time, the stand is locked and in the locked state. When the guiding member 30 is released, the locking pin 40 slides relative to the guiding member 30 to the second fixed position. At that time, the stand is unlocked and in the freely rotatable state. The stand can be switched between the freely rotatable state and the locked state by pressing the driving member 60, repeatedly. The operation is convenient and high efficiency. In this embodiment, the locking assembly 100 is an upright locking member, and can be locked in a vertical orientation. Specifically, when the pedestal 300 is arranged on the ground and the locking assembly 100 is locked, the locking assembly 100 is substantially oriented in the vertical direction, that is, it extends substantially in a direction perpendicular to the ground. In this embodiment, the driving member 60 is a pedal.

In particular, a bottom end of the connecting member 500 facing the locking assembly 100 is recessed at a central portion thereof to define a receiving chamber 501 therein. The receiving chamber 501 is used to receive the universal ball 20 therein. Preferably, the receiving chamber 501 is spherical corresponding to the universal ball 20. A bottom end of the receiving chamber 501 is opposite to the top end of the guiding member 30. A limiting surface 503 is formed on a circumferential edge of the bottom end of the receiving chamber 501. The limiting surface 503 is an inclined surface. An abutting surface 331 is formed on the top end of the guiding member 30 corresponding to the limiting surface 503. The limiting surface 503 can abut against the abutting surface 331.

Figure 3:
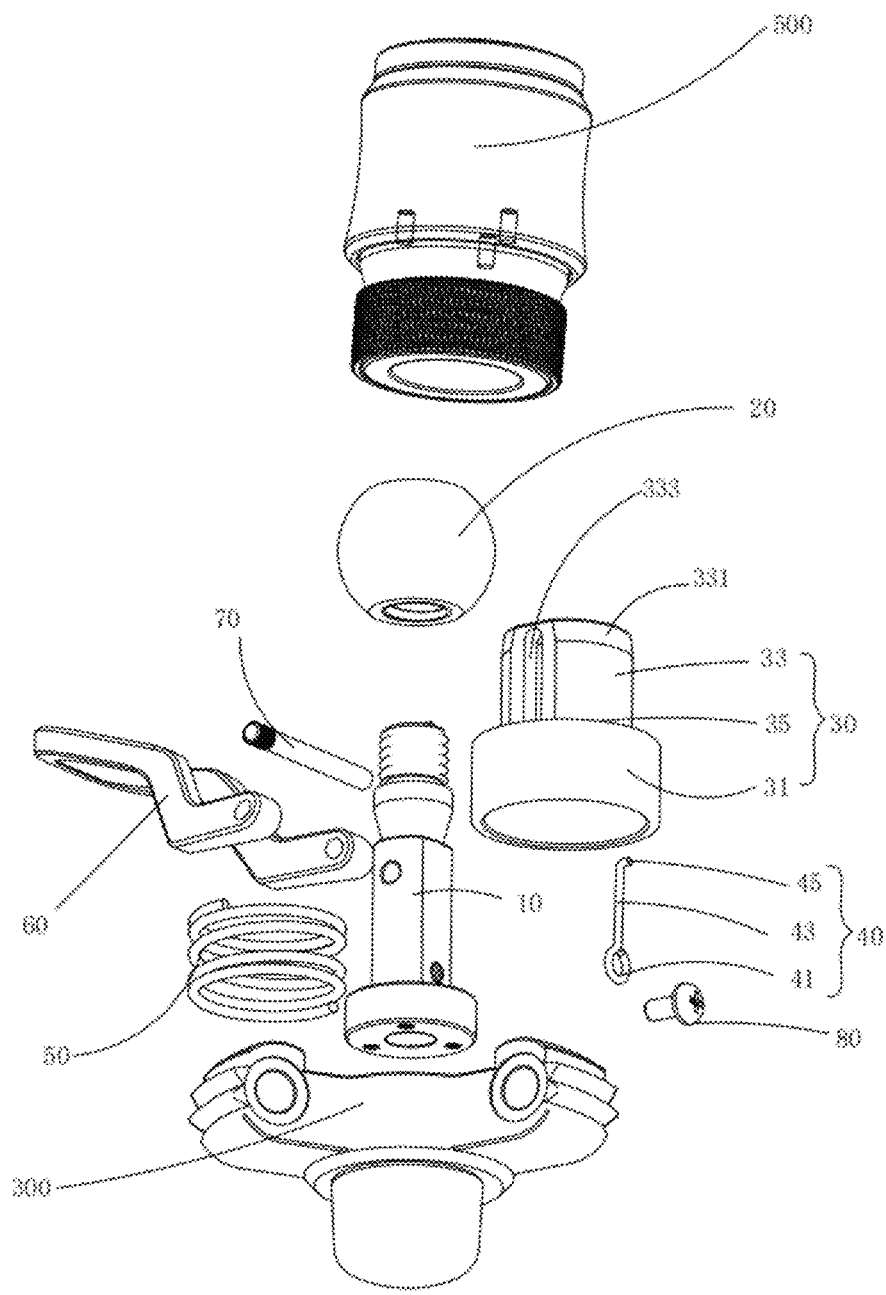
FIG. 3 is an exploded, isometric view of the stand of FIG. 1.
Figure 4:
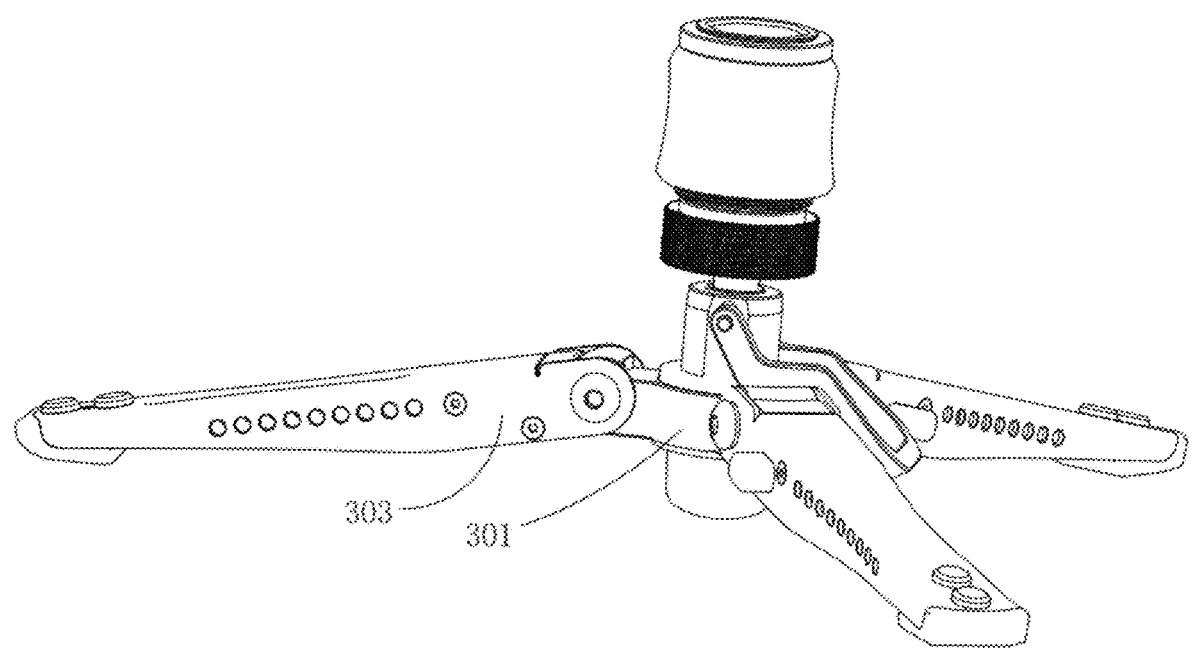
FIG. 4 is an assembled view of the stand of FIG. 3.
Figure 5:
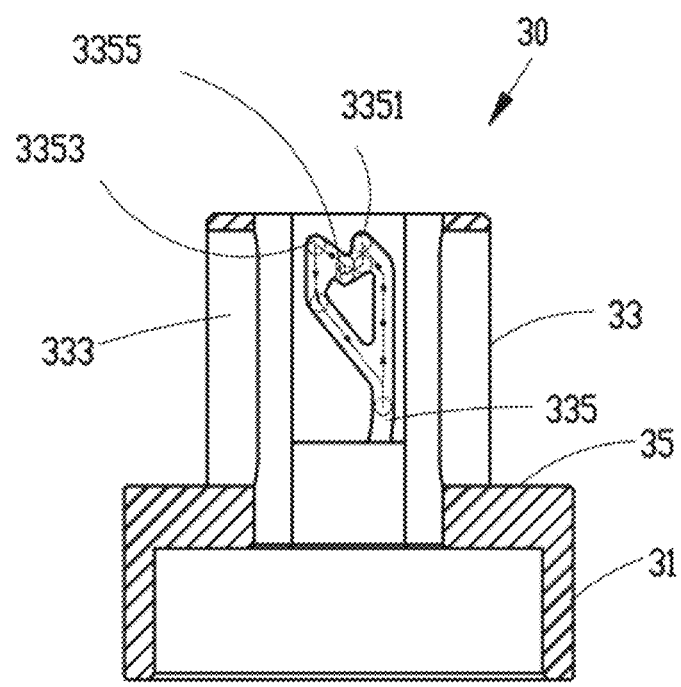
FIG. 5 is an enlarged view of a cross section of a guiding member of the stand of FIG. 3.
Figure 6:
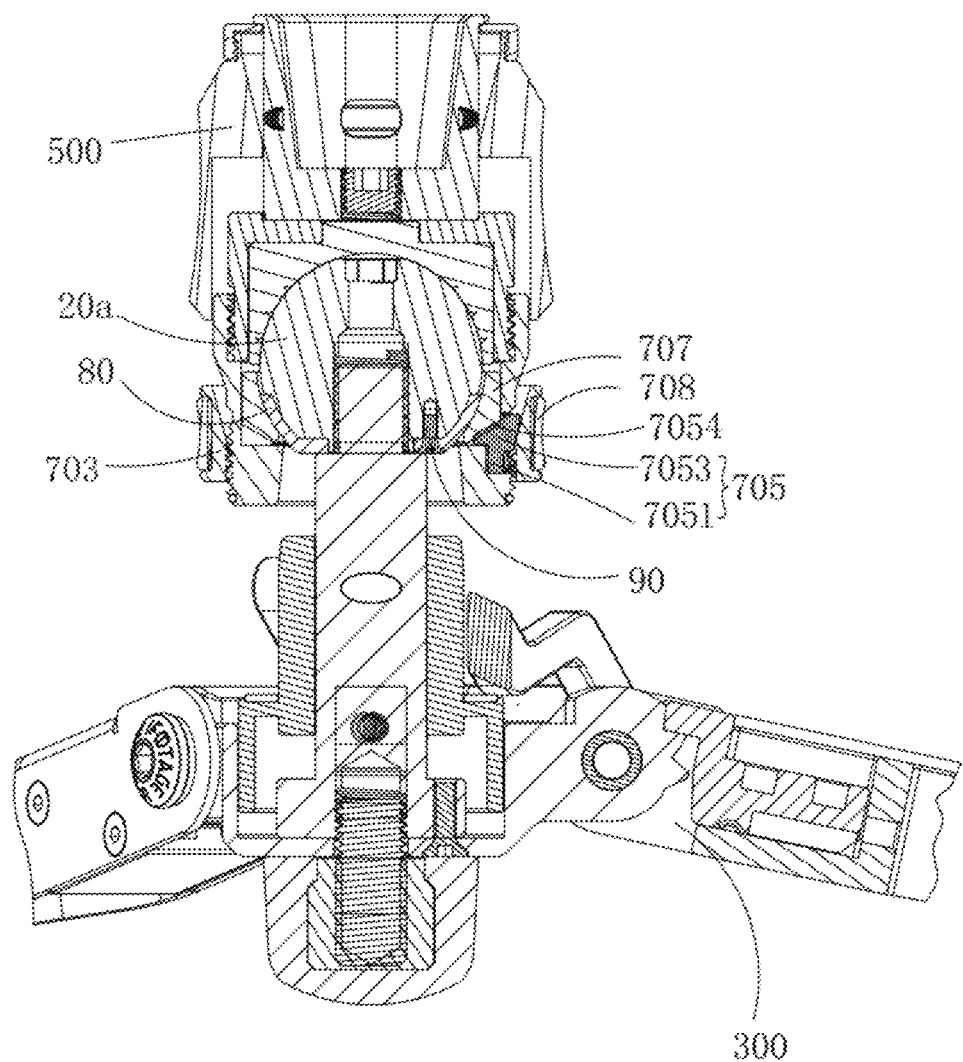
FIG. 6 is a cross sectional view of a stand according to a second embodiment of the present disclosure, wherein the stand is unlocked, and a locking member and a universal ball are locked.
Figure 6A:
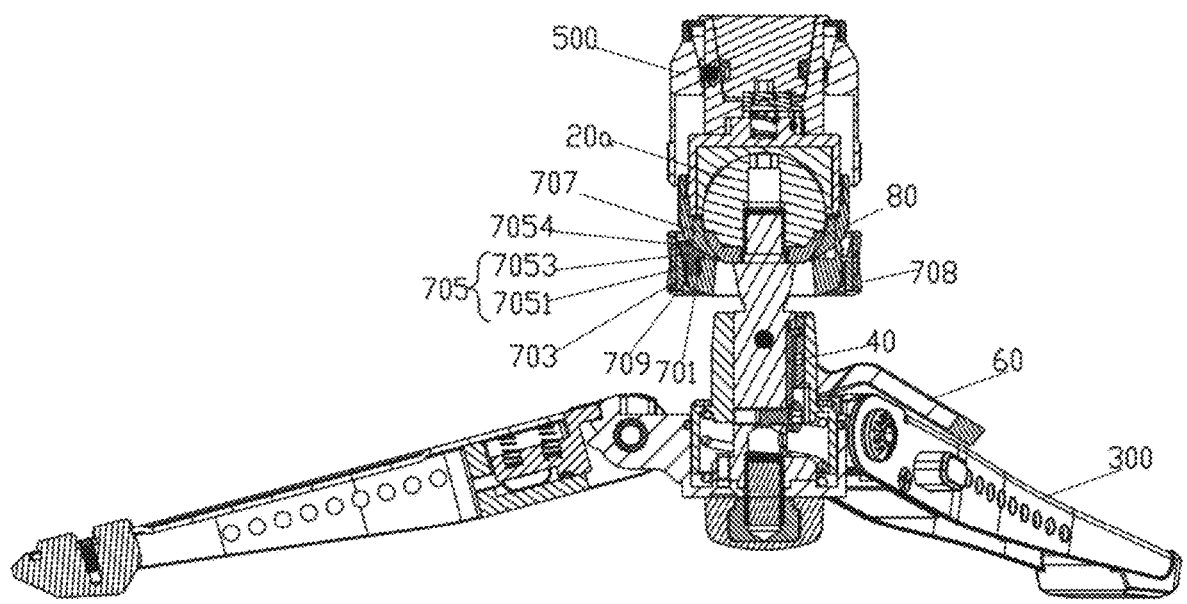
FIG. 6A is a cross sectional view of the stand, wherein the line along which the cross section in FIG. 6A is made is rotated about 15 degrees counterclockwise from the line along which the cross section in FIG. 6 is made.
Figure 7:
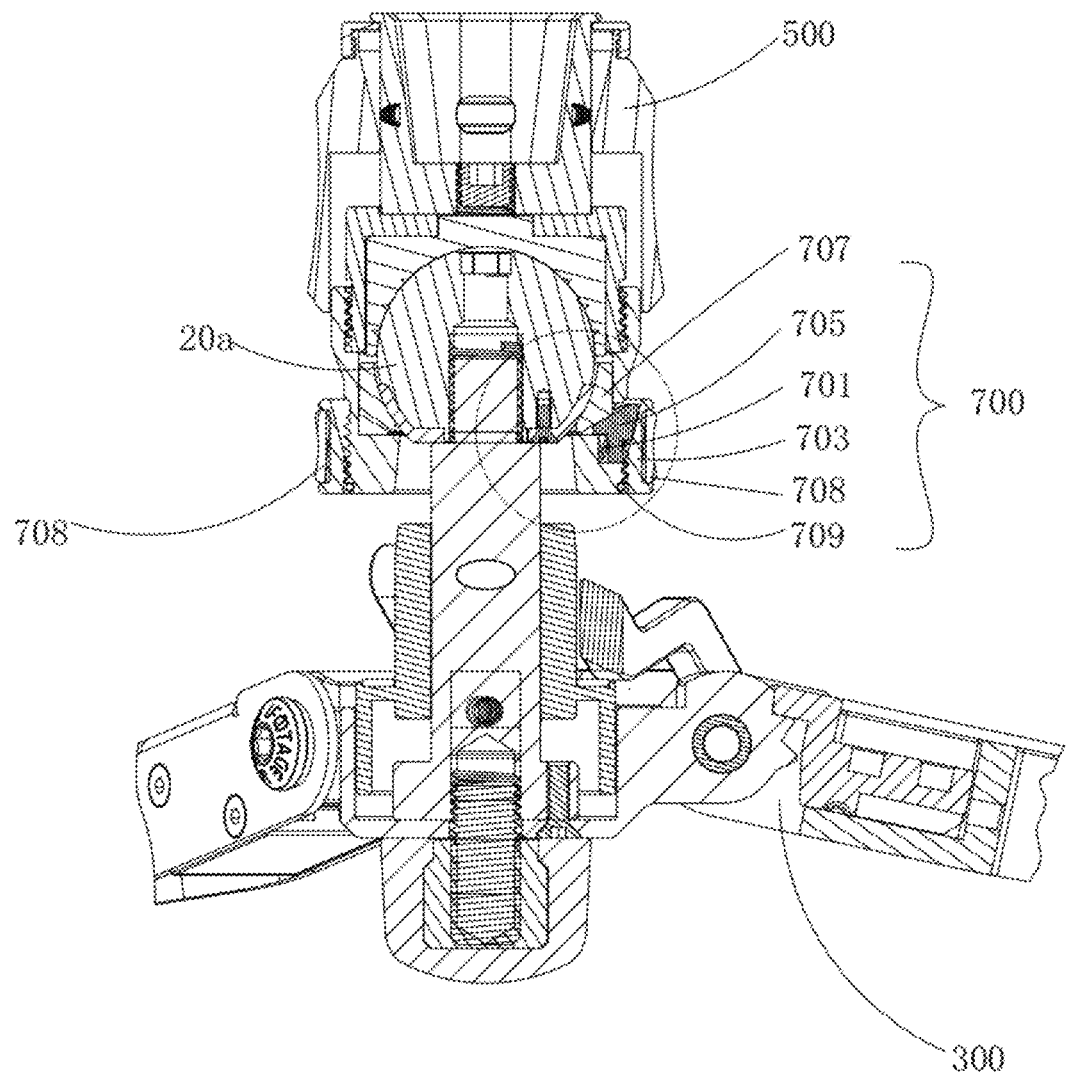
FIG. 7 is a cross sectional view of the stand of FIG. 6, wherein the stand is unlocked, and the locking member and the universal ball are unlocked.
Figure 8:
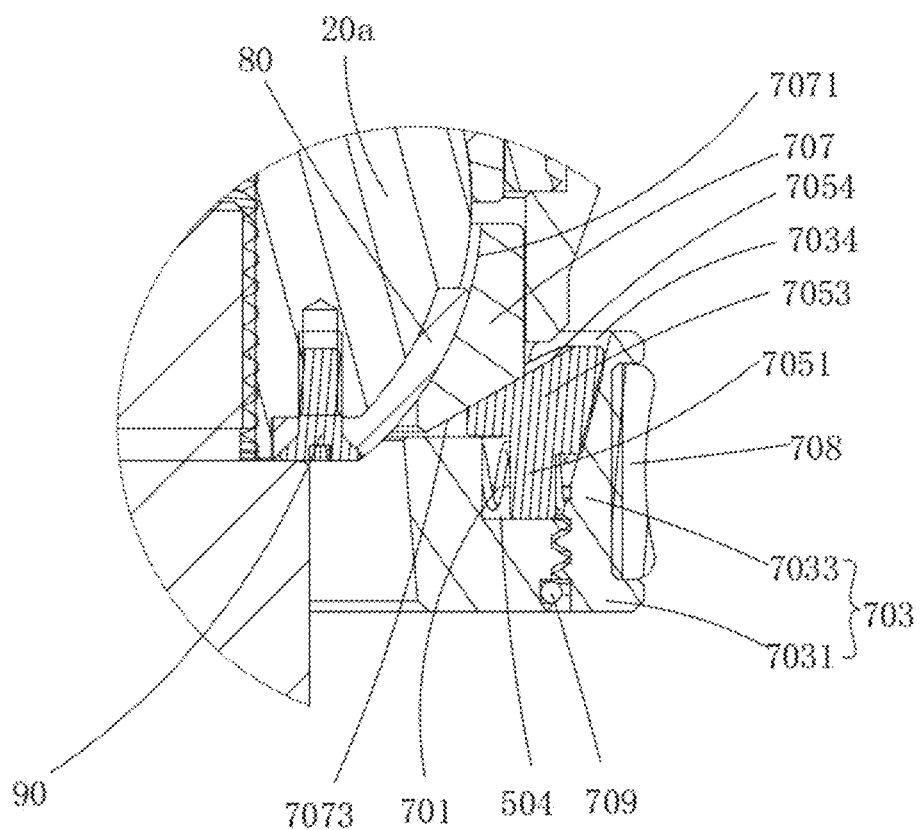
FIG. 8 is a partial enlarged view of the stand of FIG. 7, wherein the locking member and the universal ball are unlocked.
Figure 9:
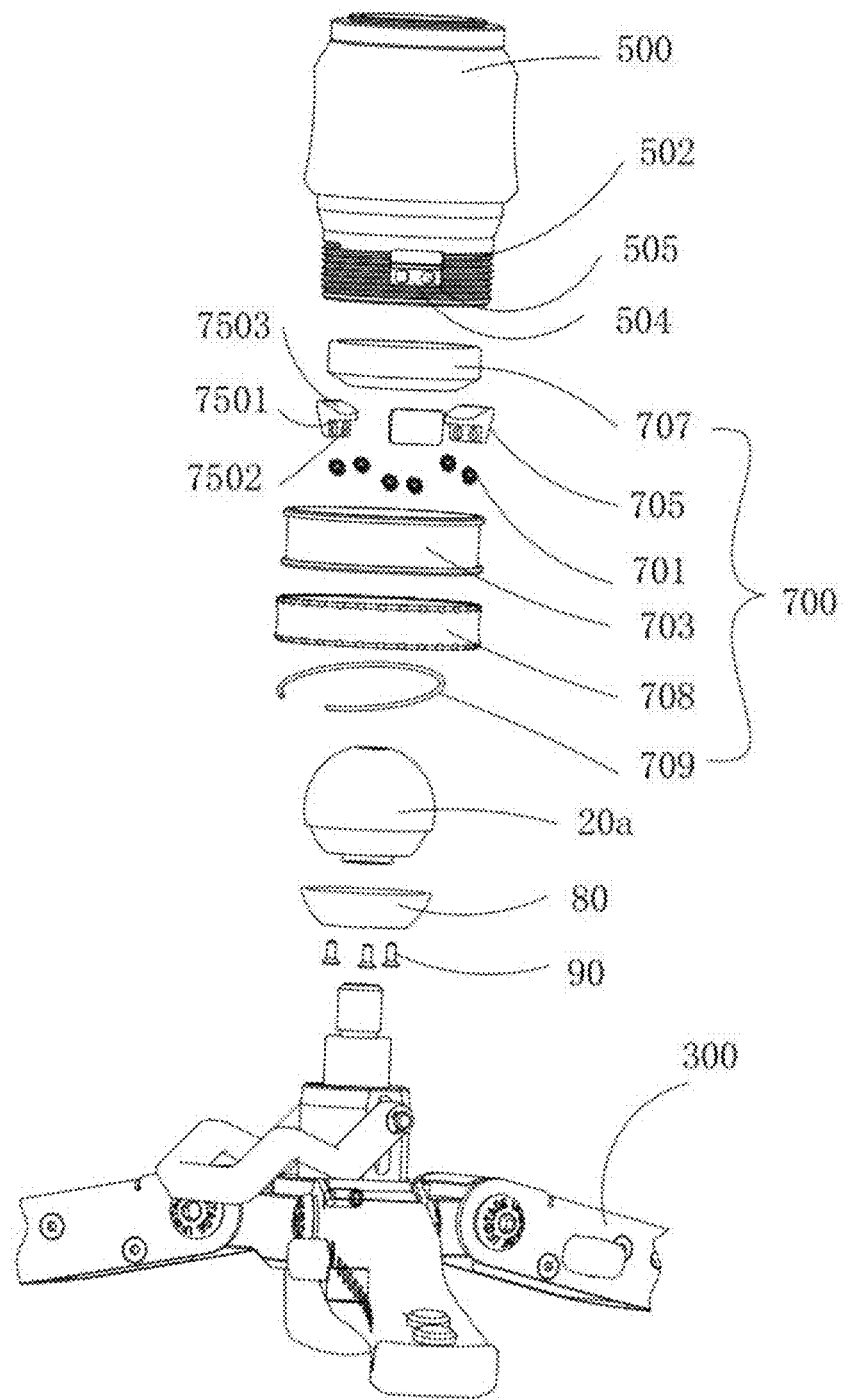
FIG. 9 is an exploded, isometric view of the stand of FIG. 6.

Specifically, the limiting surface 503 is an annular surface enclosing a hole communicating with the receiving chamber 501. Preferably, the limiting surface 503 is a truncated conical surface, and a diameter of the hole is gradually increased from top to bottom. That is, the hole has a flared opening. Referring also to FIG. 3 to FIG. 5, the guiding member 30 is substantially cylindrical, and includes a base portion 31 and an extending portion 33 protruding from a middle of a top surface of the base portion 31. A diameter of the extending portion 33 is smaller than that of the base portion 31. A step 35 is formed on a joint part of the base portion 31 and the extending portion 33 to support the driving member 60. The abutting surface 331 is formed on a top end of the extending portion 33, which is away from the base portion 31. The abutting surface 331 is an annular surface and enclosed a chamber therebetween. Preferably, the abutting surface 331 is an inclined surface, and a diameter of the top end of the extending portion 33 gradually increases from top to bottom. That is, the top end of the extending portion 33 is slightly converged. The outer diameter of the abutting surface 331 is greater than the minimum diameter of the hole defined by the limiting surface 503 and is smaller than the maximum diameter of the hole so as to ensure that the top end of the extending portion 33 can extend into the hole, and the abutting surface 331 and the limiting surface 503 can abut against each other.

A longitudinal mounting groove 333 is defined in the extending portion 33 along a length direction of the extending portion 33. The driving member 60 is pivotally connected to the support rod 10 by a connecting pin 70. The connecting pin 70 extends through the driving member 60, the mounting groove 333 of the extending portion 33 of the guiding member 30 in sequence, and can move up and down along the mounting groove 333 when the guiding member 30 is moved by the spring member 50. In this embodiment, the driving member 60 includes two spaced arms (not labeled). The arms are located at opposite sides of the support rod 10, respectively. The connecting pin 70 extends through one of the arms, the support rod 10, the mounting groove 333 in sequence, and is then inserted into the other arm. It should be understood that, in other embodiment, the driving member 60 includes only one arm.

Referring also to FIG. 5, a guiding groove 335 is defined in an inner surface of the guiding member 30. A top end of the guiding groove 335 towards the connecting member 500 forms a first temporary limiting part 3351 and a second temporary limiting part 3353 spaced from each other. A positioning part 3355 is formed below the first temporary limiting part 3351 and the second temporary limiting part 3353. The locking pin 40 is movable along the guiding groove 335 to abut against the first temporary limiting part 3351 or the second temporary limiting part 3353, or engaged at the positioning part 3355.

A longitudinal cross section of the first temporary limiting part 3351 and a longitudinal cross-section of the second temporary limiting part 3353 are both in the form of an inverted V shape, the opening of which are orientated inclinedly downwardly towards a first direction. A top end of the second temporary limiting part 3353 is located at a level above a top end of the first temporary limiting part 3351. The positioning part 3355 is located below a junction between the first temporary limiting part 3351 and the second temporary limiting part 3353, closer to the second temporary limiting part 3353. A longitudinal cross section of the positioning part 3355 is substantially V-shaped and is inclined towards a second direction. The first direction and the second direction are opposite.

A longitudinal cross section of a bottom portion of the guiding groove 335 is substantially Y-shaped, two top ends of which are connected to bottom ends of the first temporary limiting part 3351 and the second temporary limiting part 3353 at a second junction and a third junction, respectively. The second junction is located at a level above the third junction.

The spring member 50 is mounted around the support rod 10, with one end thereof received in the base portion 31. The spring member 50 is used to elastically push the base portion 31. In this embodiment, the spring member 50 is a coil spring.

The locking pin 40 includes a fixing part 41, a connecting part 43 extending from the fixing part 41, and a hook 45 formed on a free end of the connecting part 43. The fixing part 41 is pivotally connected the support rod 10. The hook 45 is received in the guiding member 30 for engaging therewith. The locking pin 40 may be formed by bending a linear material. In this embodiment, the fixing part 41 is a ring, and is pivotally connected to the support rod 10 by a screw 80. The locking pin 40 is rotatable about the screw 80. The hook 45 and the fixing part 41 are respectively located at opposite ends of the connecting part 43 and arranged in an angle. The hook 45 is used to be engaged with the guiding groove 335.

The pedestal 300 includes a main body 301 connected the support rod 10 and a plurality of legs 303 arranged on the periphery of the main body 301. In this embodiment, the pedestal 300 includes three legs, and the three legs are evenly arranged on the periphery of the main body 301.

In the present disclosure, the guiding member 30 is elastically pushed by the spring member 50 and is moved towards the connecting member 500. When the abutting surface 331 of the extending portion 33 abuts against the limiting surface 503 of the connecting member 500, the hook 45 of the locking pin 40 is moved along the guiding member 30 to the first fixed position, and the hook 45 is located at a bottom of the Y-shaped structure of the guiding groove 335. The stand is locked by the locking assembly 100.

When the driving member 60 is pressed downwardly, which in turn presses the step 35 of the guiding member 30 to move the guiding member 30 downwardly along the support rod 10, the hook 45 is moved rightwards and upwardly along the bottom of the Y-shaped structure of the guiding groove 335 to the first temporary limiting part 3351, and abuts against the top end of the first temporary limiting part 3351, which prevents the guiding member 60 from moving downwardly further. As a result, the driving member 60 can not to be pressed downwardly further, that is, the operator finishes one operation. At that time, the spring member 50 is compressed by the guiding member 30. Then, the driving member 60 is released, the guiding member 30 moves upwardly under the upward force provided by the spring member 50, the hook 45 moves downwardly from the top end of the guiding groove 335 to the positioning part 3355 and abuts against the bottom of the positioning part 3355. At that time, the hook is blocked, as such, the guiding member 30 is unable to further move upwardly and thus is locked there. At that time, the guiding member 30 is spaced from the connecting member 500, and the connecting member 500 is unlocked and can rotate about a center of the universal ball 20.

When the driving member 60 is pressed again, the driving member 60 moves downwardly and presses the step 35 of the guiding member 30 to drive the guiding member 30 slide downwardly. The hook 45 is moved upwardly along the guiding groove 335 from the positioning part 3355 to the second temporary limiting part 3353 until the hook 45 abuts against the top end of the second temporary limiting part 3353. In this state, the guiding member 30 is blocked and the guiding member 30 cannot be pressed downwardly further. That is, the driving member 60 cannot move downwardly further, and the operator finishes one operation. Then, the driving member 60 is released, the guiding member 30 moves upwardly under an upward force provided by the spring member 50, the hook 45 moves downwardly along the guiding groove 335 from the second temporary limiting part 3353 to the bottom of the Y-shaped structure of the guiding groove 335. In this state, the abutting surface 331 of the extending portion 33 abuts against the limiting surface 503 of the connecting member 500, the connecting member 500 is locked and cannot rotate, and the hook 45 is located at the bottom of the Y-shaped section and free of force. In the present disclosure, the driving member 60 can be pressed repeatedly, the stand can be switched between the locked state and the freely rotatable state quickly as the hook 45 moves along the guiding groove 335 to limit positions. The operation is convenient and high efficiency, without using hands.

Referring to FIG. 6 to FIG. 9, a stand for photographic equipment of a second embodiment is shown. This stand is similar to the stand of the first embodiment, but differs from the stand of the first embodiment in that the stand of the second embodiment further includes a locking member 700. The locking member 700 is mounted around the connecting member 500 to interact with the universal ball 20a. When the stand is unlocked, the connecting member 500 can rotate relative to the universal ball 20a. The locking member 700 is configured to lock the universal ball 20a at the required angle, to fix the connecting member 500 relative to the universal ball 20a. As such, the connecting member 500 can be fixed at the required angle.

Specifically, the connecting member 500 includes a thread section 502 with outer screw threads formed at the bottom end of the connecting member facing towards the locking assembly 100. A central portion of an outer surface of the connecting member 500 is recessed in the radial direction of the connecting member 500 to define a receiving groove 504 therein. In this embodiment, the receiving groove 504 is formed in the thread section 502.

The locking member 700 includes a locking block 705 which is partially movably received in the receiving groove 504, a locking sleeve 703 mounted around the bottom end of the connecting member 500 and thread connected with the connecting member 500, and a locking element 707 received in the receiving chamber 501 of the connecting member 500 and located at a bottom end of the universal ball 20a. An inner part of the locking block 705 can extend into the bottom end of the connecting member 500 through the receiving groove 504 and abut against the locking element 707. The locking member 700 is configured to lock the universal ball 20a by means of driving the locking sleeve 703 upwardly along the longitudinal direction of the connecting member 500 to push the locking block 705 moved inwardly, and in turn the locking block 705 pushes the locking element 707 upwardly until the locking element 707 is locked with respect to the universal ball 20a.

Specifically, an aperture is defined in the connecting member 500 at an area where the receiving groove 504 is located, and extends through the wall of the connecting member 500. The inner part of the locking block 705 can extend through the aperture into the receiving chamber 501 and is located below the locking element 707. An outer part of the locking block 705 protrudes radially outwardly from the receiving groove 504. The locking sleeve 703 is screwed in to move upwardly along the bottom end of the connecting member 500, so as to push the locking block 705 to move inwardly, and the locking block 705 pushes the locking element 707 upwardly to make the locking element 707 move towards the universal ball 20a until the universal ball 20a is locked by the locking element 707. As such, the connecting member 500 is locked relative to the universal ball 20a.

Preferably, the locking member 700 of this embodiment further includes a reset spring 701. The reset spring 701 is configured to provide an outward elastic force for the locking block 705 and assist the locking block 705 to reset when the reset spring 701 is released. In this embodiment, the reset spring 701 is received in the receiving groove 504, one end of the reset spring 701 abuts against the bottom of the connecting member 500, and the other end of the reset spring 707 abuts against the locking block 705. In this embodiment, the reset spring 701 is a helical spring.

In this embodiment, the locking sleeve 703 is annular and continuous in the circumferential direction. The locking sleeve 703 includes a locking section 7031 and a guiding section 7033 along an axial direction thereof. The locking section 7031 has a uniform inner diameter with inner screw threads to engage with the outer screw threads of the connecting member 500. The guiding section 7033 extends upwardly from a top end of the locking section 7031. An inner diameter of the guiding section 7033 gradually increases from a bottom end connected to the locking section 7031 to a top end. Thus, an inner surface of the guiding section 7033 is tapered and inclined outwardly from bottom to top. When the locking sleeve 703 is mounted around the connecting member 500, a gap 7034 is defined between the inner surface of the guiding section 7033 and the outer surface of the connecting member 500. Because the inner surface of the guiding section 7033 is inclined, a width of the gap 7034 is increased gradually from bottom to top.

It is understood that, in other embodiments, the locking sleeve 703 may be in the form of a plurality of separated arcuate plates provided that the arcuate plates can work with the locking block 705.

A protective sleeve 708 may be mounted around an outer surface of the locking sleeve 703 to protect the locking sleeve 703 and improve user experience. The protective sleeve 708 is a leather sleeve or a plastic sleeve.

The locking block 705 includes a connecting portion 7051 and a protruding portion 7053 extending upwardly from the connecting portion 7051. The connecting portion 7051 is received in the receiving groove 504 and abuts against the respective reset spring 701. In this embodiment, the connecting portion 7051 is substantially rectangular.

In order to connect the reset spring 701 more firmly, in this embodiment, preferably, the bottom wall of the receiving groove 504 is further recessed to define a first hole 505. The first hole 505 is a blind hole. An inner surface of the connecting portion 7051 is also recessed to define a receiving hole 7052 therein. Two opposite ends of the reset spring 701 are received in the first hole 505 and the receiving hole 7052, respectively. Alternatively, in other embodiments, at least one of the bottom wall of the receiving groove 504 and the corresponding connecting portion 7051 of the locking block 705 is provided with a post, an end of the reset spring 701 is mounted around the post to form a stable connection and positioning.

The protruding portion 7053 includes a pushing surface 7054 inclined towards the locking element 707. The pushing surface 7054 extends upwardly and outwardly from a bottom end thereof that faces the connecting portion 7051 to contact the locking element 707. In this embodiment, the protruding portion 7053 is substantially wedge-shaped, located at a top portion of the receiving groove 504 and aligned with the aperture. The bottom of the protruding portion 7053 is connected the top of the connecting portion 7051. An outer side of the protruding portion 7053 extends out of the receiving groove 504 into the gap 7034 between the locking sleeve 703 and the connecting member 500. An outer surface of the protruding portion 7053 faces the inner surface of the guiding section 7033. A top surface of the protruding portion 7053 connects top ends of the outer surface and the pushing surface 7054. An inner side of the protruding portion 7053 extends beyond an inner side of the connecting portion 7051. In this embodiment, a width of the bottom of the protruding portion 7053 is larger than that of the connecting portion 7051. Specifically, a width of the protruding portion 7053 decreases gradually from bottom to top. Therefore, when the locking sleeve 703 is moved upwardly, the inclined inner surface of the guiding section 7033 of the locking sleeve 703 pushes the locking block 705 inwardly, and thus the locking block 705 is moved inwardly to push the locking element 707 upwardly.

In this embodiment, the outer surface of the protruding portion 7053 is an inclined surface, extending upwardly and outwardly from the top end of the outer surface of the connecting portion 7051. Preferably, the outer surface of the protruding portion 7053 and the inner surface of the guiding section 7033 are mutually inclined. Therefore, a contact area between the outer surface of the protruding portion 7053 and the inner surface of the guiding section 7033 is increased, such that the force applied on the locking block 705 is uniform. Optionally, the pushing surface 7054 may be a curved surface or a flat surface. In this embodiment, the pushing surface 7054 is a curved surface. The pushing surface 7054 is concaved along a circumferential direction of the locking sleeve 703.

In this embodiment, three receiving grooves 504 are defined in the connecting member 500 at the thread section 502, which are evenly spaced along the circumferential direction. Three locking blocks 705 are received in the receiving grooves 504, respectively. The connecting member 500 defines two first holes 505 at the bottom wall of each receiving groove 504. Two reset springs 701 are respectively received in the two first holes 505 in the corresponding receiving grooves 504 and abut against the locking block 705.

It should be understood that, in other embodiments, the locking member 700 may include two receiving grooves 504 symmetrically arranged on opposite sides of the bottom end of the connecting member 500. The number of the receiving groove 504 may be one or more, which is selected as required, and the number of the reset springs and the shape of the reset spring can be adjusted accordingly.

The locking element 707 includes a locking surface 7071 towards the universal ball 20a and a contacting surface 7073 engaged with the pushing surface 7054 of the locking block 705. The locking surface 7071 is fitted with the universal ball 20a and conforming the universal ball 20a. The contacting surface 7073 extends upwardly and outwardly from bottom to top.

Specifically, the locking element 707 is annular, and an inner diameter thereof decreases gradually from top to bottom. An opening is defined at a bottom end of the locking element 707. A size of the opening is smaller than that of the universal ball 20a, and thus, the universal ball 20a can be partially received in the locking element 707 without being detached from the opening. The contacting surface 7073 is formed at an outer periphery of a bottom of the locking element 707. The contacting surface 7073 extends upwardly and radially outwardly from a central portion of the locking element 707 to be fitted with the pushing surface 7054 of the locking block 705. Each of the contacting surface 7073 and the pushing surface 7054 is a slope. When the locking block 705 is pushed by the locking sleeve 703 to move inwardly, the contacting surface 7073, and thus the locking element 707, is pushed upwardly by the locking block 705 until the locking element 707 contacts and locks the universal ball 20a.

Preferably, the inner surface of the locking element 707 is a concave curved surface, acting as the locking surface 7071 fitted with the universal ball 20a.

In order to avoid an abrasion of the universal ball 20a, in this embodiment, a gasket 80 is provided at the bottom end of the universal ball 20a. The locking element 707 directly contacts an outer surface of the gasket 80 when the locking element 707 locks the universal ball 20a. The shape of the gasket 80 is corresponding to the bottom end of the universal ball 20a. Preferably, a periphery of the bottom end of the universal ball 20a is recessed to receive the gasket 80 therein. Therefore, on the one hand, it is convenient for quick alignment when gasket 80 is installed on the universal ball 20a, and on the other hand, the height difference between the fixed gasket 80 and the rest outer surface of the universal ball 20a can be reduced. The gasket 80 is fixed with the universal ball 20a by screws 90. In this embodiment, the screws 90 are engaged with the screw holes of the universal ball 20a after extending through holes of the bottom end of the gasket 80.

Preferably, the locking member 700 also includes a limiting member 709. The limiting member 709 is fixed on the bottom of the thread section 502 to prevent the locking sleeve 703 from screwing out from the thread section 502. In this embodiment, the limiting member 709 is a circlip surrounding the thread section 502.

Figure 10:
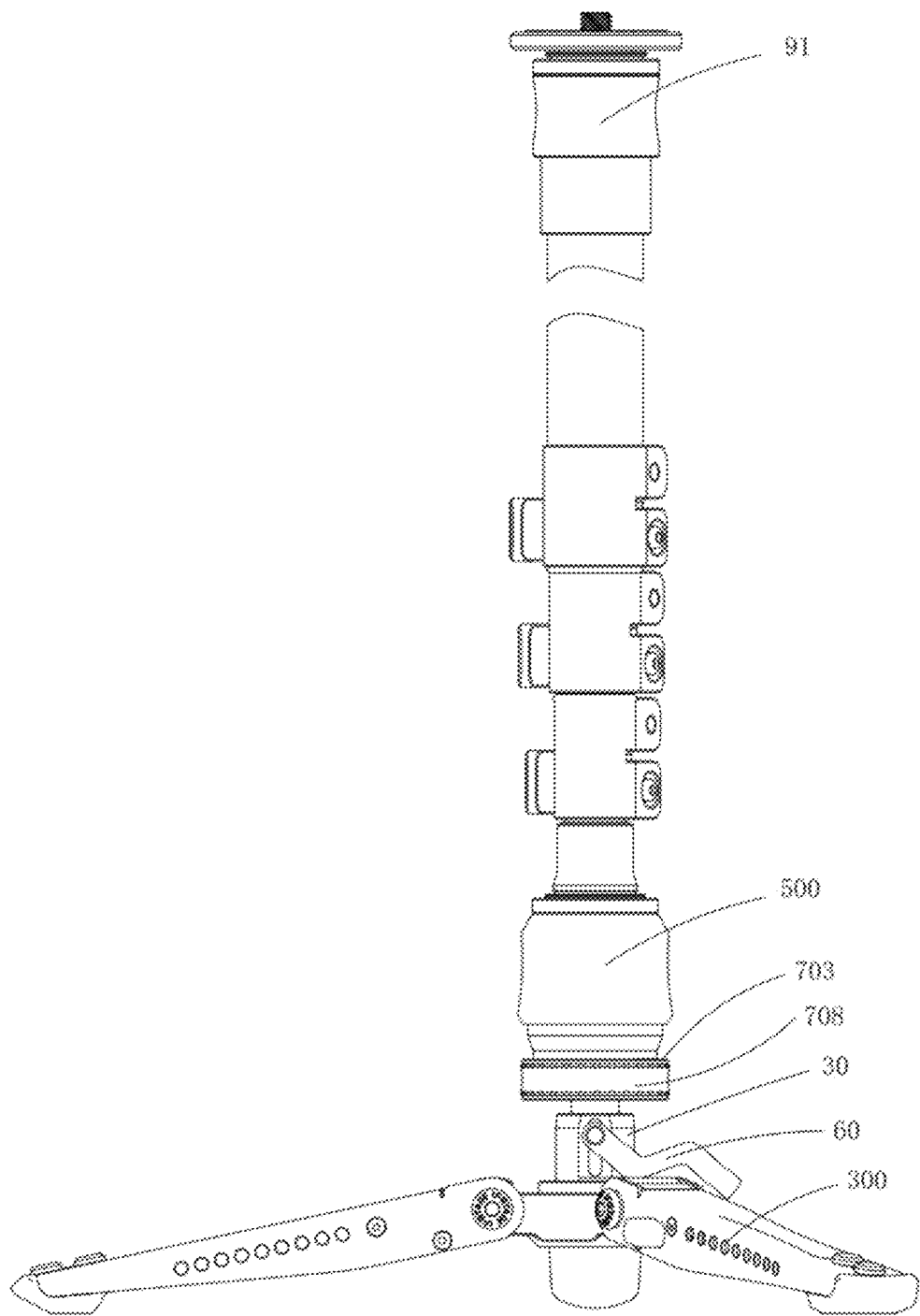
FIG. 10 is an assembled view of the stand of FIG. 9, wherein the stand is in one of the use states.

Referring to FIG. 10, in use, the stand can be connected to the platform by the connecting pod 91. Specially, a top end of the connecting pod 91 is used to connect the platform, and a bottom end of the connecting pod 91 is connected the top end of the connecting member 500 which is away from the universal ball 20a. The camera equipment can be fixed on the platform for long-range shooting. It is understood that in close-range shooting, the connecting rod 91 can be removed, and the platform is directly fixed on the top of the connecting member 500, and the camera is fixed on the platform, so as to form an apparatus for low angle shooting.

In this embodiment, when the connecting member 500 is required to be locked relative to the universal ball 20a, the locking sleeve 703 is moved upwardly such that the inner surface of the guiding section 7033 of the locking sleeve 703 move along an outer surface of the connecting portion 7051 to the outer surface of protruding portion 7053 of the locking block 705. As the inner diameter of the guiding section 7033 decreases gradually from top to bottom, the locking block 705 is pushed by the guiding section 7033 and moved inwardly, and the locking element 707 is pushed by the pushing surface 7054 of the locking block 705 and moved upwardly to the gasket 80 along the pushing surface 7054. The locking element 707 is moved upwardly until the locking surface 7071 of the locking element 707 abuts against the outer periphery of the top gasket 80. As such, the locking element 707 is locked relative to the universal ball 20a, and the connecting member 500 can be fixed in a required position.

The above descriptions are only preferred embodiments of the present disclosure, and the scope of the present disclosure is not limited to the above-mentioned embodiments. Persons skilled in the art will derive from disclosure of the present application modifications and equivalents without departing from the spirit and scope of the present disclosure.

What is claimed is:

1. A stand for photographic equipment, comprising:
 a connecting member;
 a pedestal; and
 a locking assembly connected between the connecting member and the pedestal; the locking assembly comprising:
 a support rod;
 a guiding member mounted around the support rod;
 a locking pin fixed on the support rod and engaged with the guiding member;
 a spring member located between the pedestal and the guiding member; and
 a driving member pivotally connected to the support rod;
 wherein one end of the support rod and the connecting member are rotatably connected with each other by a universal ball, the locking assembly is configured to make the locking pin move along the guiding member to a first fixed position or a second fixed position by pressing the driving member, wherein when the locking pin is located at the first fixed position, a top end of the guiding member abuts against and locks the connecting member, and when the locking pin is located at the second fixed position, the guiding member releases the connecting member.

2. The stand for photographic equipment of claim 1, wherein the universal ball is mounted on a top end of the support rod, a bottom end of the connecting member facing the locking assembly is recessed at a central portion thereof to define a receiving chamber therein for receiving the universal ball, a limiting surface is formed on a circumferential edge of the receiving chamber, an abutting surface is formed on the top end of the guiding member corresponding to the limiting surface, and wherein the abutting surface and the limiting surface are configured to abut against each other.

3. The stand for photographic equipment of claim 2, wherein the guiding member is substantially cylindrical, and comprises a base portion and an extending portion protruding from the base portion, a step is formed on a joint part of the base portion and the extending portion to support the driving member, and wherein the abutting surface is formed on a top end of the extending portion away from the base portion.

4. The stand for photographic equipment of claim 3, wherein a longitudinal mounting groove is defined in the extending portion along a length direction thereof, the driving member is pivotally connected to the support rod by a connecting pin, the connecting pin extends through the driving member, the mounting groove of the extending portion of the guiding member that is mounted around the support rod, and the support rod in sequence, and is movable up and down along the mounting groove when the guiding member is urged by the spring member to move.

5. The stand for photographic equipment of claim 3, wherein the spring member is mounted around the support rod with one end thereof received in the base portion, and the spring member is configured to elastically urge the base portion.

6. The stand for photographic equipment of claim 1, wherein the locking pin comprises a fixing part and a hook, the fixing part is pivotally connected to the support rod, and the hook is received in the guiding member for engaging therewith.

7. The stand for photographic equipment of claim 6, wherein a guiding groove is defined in an inner surface of the guiding member, a top end of the guiding groove towards the connecting member forms a first temporary limiting part and a second temporary limiting part spaced from the first temporary limiting part, a positioning part is formed below the first temporary limiting part and the second temporary limiting part, and the locking pin is engageable with the first temporary limiting part, the second temporary limiting part, and the positioning part.

8. The stand for photographic equipment of claim 7, wherein a longitudinal cross section of the first temporary limiting part and a longitudinal cross section of the second temporary limiting part are both in the form of an inverted V-shape with an opening, and the openings are orientated towards a first direction, and a top end of the second temporary limiting part is located at a level above a top end of the first temporary limiting part.

9. The stand for photographic equipment of claim 8, wherein the guiding groove further comprises a portion having a substantially Y-shaped longitudinal cross section, two top ends of the portion are respectively connected to the first temporary limiting part and the second temporary limiting part, wherein the top end of the portion that is connected to the first temporary limiting part is located at a level above the top end of the portion that is connected to the second temporary limiting part.

10. The stand for photographic equipment of claim 7, wherein a longitudinal cross section of the positioning part is substantially V-shaped with an opening inclined towards a second direction opposite to the first direction.

11. The stand for photographic equipment of claim 1, further comprising a locking member lockable relative to the universal ball, wherein a receiving groove is defined in an outer periphery of the connecting member, the locking member comprises a locking sleeve mounted around the connecting member, a locking block movably received in the receiving groove, and a locking element located at a bottom end of the universal ball; wherein an inner end of the locking block is capable of extending into the connecting member via the receiving groove and abutting against the locking element, wherein the locking member is configured such that when the locking sleeve is driven to move upwardly along a longitudinal direction of the connecting member to push the locking block to move inwardly, the locking block drives the locking element to move upwardly until the locking element is locked relative to the universal ball.

12. The stand for photographic equipment of claim 11, further comprising a reset spring configured to provide an outward elastic force to the locking block, the reset spring is received in the receiving groove, one end of the reset spring abuts against a wall of the receiving groove, and an other end of the reset spring abuts against the locking block.

13. The stand for photographic equipment of claim 11, wherein the locking sleeve is annular and continuous in a circumferential direction thereof, and comprises a locking section and a guiding section along an axial direction thereof, the locking section is configured to move up and down along the connecting member, the guiding section extends upwardly from a top end of the locking section, an inner diameter of the guiding section increases gradually from a bottom end connected to the locking section to a top end, a gap is defined between an inner surface of the guiding section and an outer surface of the connecting member, and a width of the gap increases gradually from bottom to top.

14. The stand for photographic equipment of claim 13, wherein the locking block comprises a connecting portion and a protruding portion extending upwardly from the connecting portion, the connecting portion is received in the receiving groove, the protruding portion comprises a pushing surface inclined towards the locking element, and the pushing surface extends upwardly and outwardly from a bottom end thereof to contact the locking element.

15. The stand for photographic equipment of claim 14, wherein the protruding portion is located at a top portion of the receiving groove, a bottom of the protruding portion is connected a top of the connecting portion, an outer side of the protruding portion extends out of the receiving groove into the gap between the locking sleeve and the connecting member, an outer surface of the protruding portion faces the inner surface of the guiding section, a top surface of the protruding portion connects top ends of the outer surface and the pushing surface of the protruding portion, an inner side of the protruding portion extends beyond an inner side of the connecting portion.

16. The stand for photographic equipment of claim 14, wherein the locking element comprises a locking surface towards the universal ball and a contacting surface engaged with the pushing surface of the locking block, the locking surface is fitted with the universal ball and configured to conform the universal ball, and the contacting surface extends outwardly and upwardly from bottom to top.

17. The stand for photographic equipment of claim 16, wherein the locking element is annular and an inner diameter thereof decreases gradually from top to bottom, an opening is defined at a bottom end of the locking element, a size of the opening is smaller than a size of the universal ball, and thus the universal ball is partially receivable in the locking element without being detached from the opening, the contacting surface is formed at an outer periphery of a bottom of the locking element, the contacting surface extends inclinedly from a central portion of the locking element radially outwardly and upwardly to be engaged with the inclined pushing surface of the locking block.

18. The stand for photographic equipment of claim 11, further comprising a gasket fixed on the universal ball, and the locking element is configured to directly contact the gasket.

19. The stand for photographic equipment of claim 11, wherein the locking member further comprises a limiting member, the limiting member is fixed on a bottom of the connecting member to prevent the locking sleeve from screwing out from the connecting member.

20. The stand for photographic equipment of claim 11, further comprising a protective sleeve mounted around a middle portion of an outer surface of the locking sleeve.

* * * * *